May 30, 1944.  E. A. F. PRESSER  2,350,299
DOUBLE ACTING KNEADER
Filed June 28, 1943  2 Sheets-Sheet 2
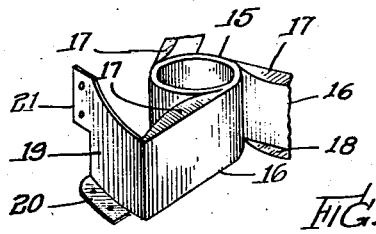
FIG. 5.
FIG. 6.
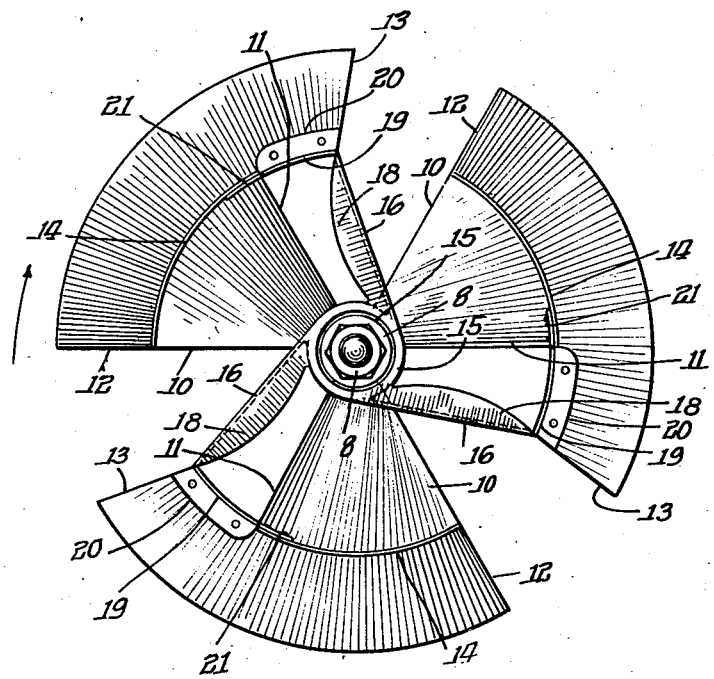
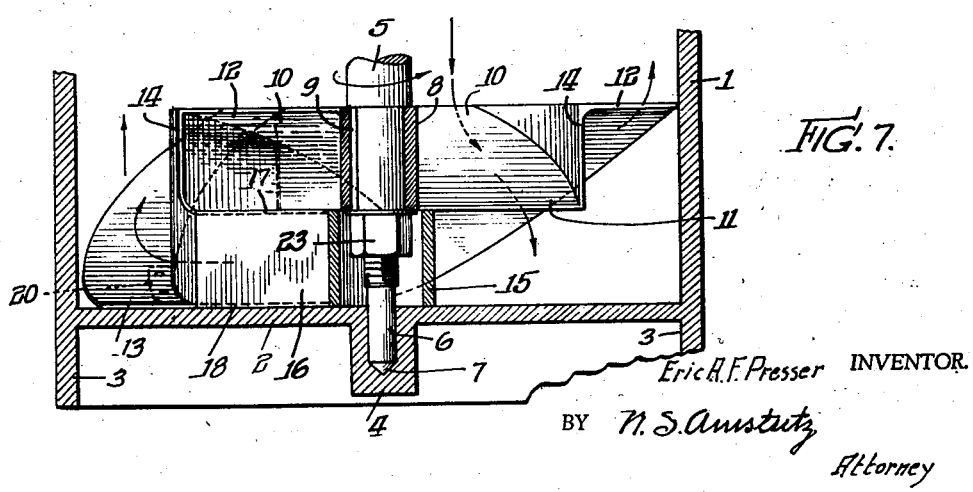
FIG. 7.
Eric A. F. Presser INVENTOR.
BY N. S. Anstutz
Attorney Patented May 30, 1944

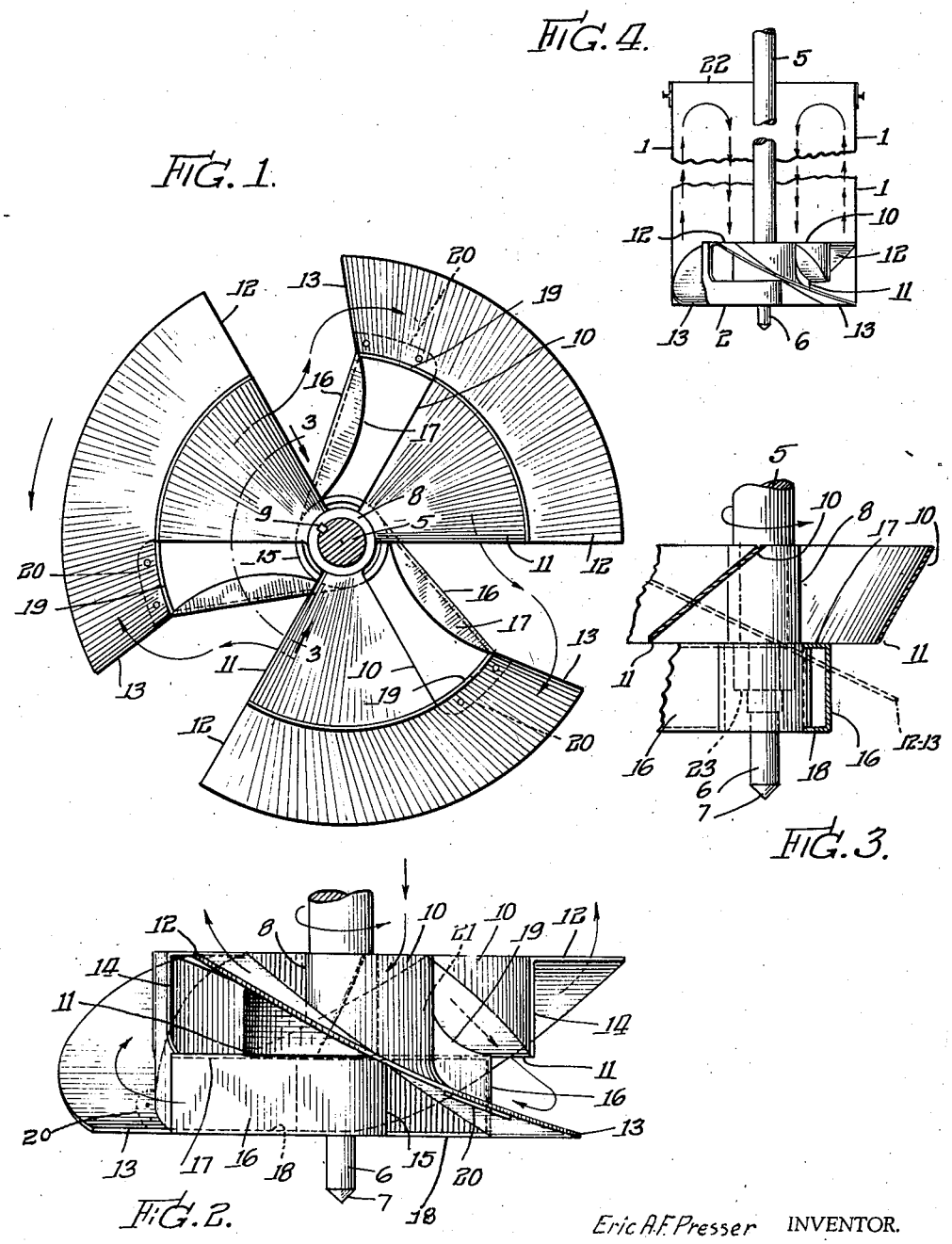

2,350,299

UNITED STATES PATENT OFFICE 2,350,299

DOUBLE ACTING KNEADER

Eric A. F. Presser, East Chicago, Ind.

Application June 28, 1943, Serial No. 492,517

4 Claims. (Cl. 259—97)

My invention relates to improvements in double acting kneaders and it more especially includes the features pointed out in the annexed claims.

The purpose of my invention is to provide mechanical means for kneading different materials by simulating the action of hand kneading of flour in baking bread; or it may be used in kneading powdered mixtures in forming plastics, or thoroughly mixing printing inks, paints, etc.; that combines a two-way movement of the material in the same container; and that subjects the material to considerable pressure at the point where the movement of the material against the bottom wall of the container is instantly changed to an upward movement in a reversed direction.

With these and other related purposes I illustrate in the accompanying drawings such instances of adaptation as will disclose the broad features of the invention without limiting myself to the specific details shown thereon and described herein.

Fig. 1 is a top plan of a kneading element.

Fig. 2 is a bottom end front elevation of Fig. 1.

Fig. 3 is a side elevation partly in section on curved line 3—3 of Fig. 1.

Fig. 4 is a diagrammatic view showing the change in direction of movement of the material.

Fig. 5 is a detached perspective of a deflector.

Fig. 6 is a bottom plan of Fig. 1.

Fig. 7 is a front elevation of Fig. 1, partly in section.

In practicing my invention I may use whatever alternatives of construction and equivalence of parts that the exigencies of various conditions may demand without departing from the broad spirit of the invention.

Any suitable container may be used. Its side walls are spaced apart from the kneading element a slight distance so as to afford clearance. The kneader is attached to a shaft which is turned by any desired source of power. The kneader is first placed in the container in near engagement with the bottom and then the material in powdered form is put on top of it or the material may be put in first. If desired a cover may be secured on top of the container, or dependence may be placed on the weight of the material to reverse its movement at the top of the container.

The kneading action forces the material downward against the bottom of the container under pressure and it is instantly deflected and reversed so as to be moved upward as shown by Fig. 4. At the top of the container it is automatically reversed again and directed downward to repeat the cycle as often as may be required. When the kneading action has been completed the kneader is lifted out of the container and the contents are removed for use elsewhere.

The outer walls 1 of the container are joined to the bottom 2. The walls 1 extend below the bottom to form an annular flange 3. At the center of the bottom there is a depending boss 4 in which the lower end of the shaft 5 is seated. At this end the shaft has a reduced diameter 6 which terminates in a cone end 7. The main portion of the kneader with its lowering incline 10—11 and the elevating incline 13—12 has a hub 8 in which the shaft 5 is secured by a key 9 and also a nut 23.

The lowering incline starts at 10 and it ends at 11. The entrance to the elevating incline is at 13 and the exit of this incline is at 12. Both inclines are separated by a joining wall 14.

A baffle supporting ring 15 has three baffle plates 16 attached to it tangentially. These plates are fastened by means of a toe 20 to the lower end of the incline 13—12 and at 21 to the inside of the wall 14 (Fig. 6). The wall 19 is a continuation of the wall 14. Each baffle plate 16 has an upper stiffening rib 17 and a lower stiffening rib 18. The depending wall 19 connects ear 21 to the fastening toe 20 (Fig. 5). The ear 21 is attached to the inside of the wall 14 (Fig. 6) and the toe 20 to the underside of the incline 13—12. In case a cover is employed it is identified as 22. It may be fastened in any desired manner.

The diagram Fig. 4 clearly shows the relation of the descending and the ascending material by arrows. By forcing the contents of the container against the bottom 2 puts it under pressure which insures that the air is thoroughly excluded and the entire mass is made as homogeneous as possible. The mechanism is very simple but effective in accomplishing the unique purpose of the invention.

The baffle plates 16 serve to prevent the downcoming material to pass too rapidly into the path of the ascending inclines, thus they assist in producing an increase of pressure and a more homogeneous mixture. The horizontal ribs 17 and 18 reinforce the baffles or deflectors 16. It is of course understood that the baffle feature, if desired, may be combined integrally with the oppositely positioned inclines 10—11 and 13—12.

It is an outstanding feature of my invention that when it is used to knead dough in making bread that the material is so thoroughly acted on under pressure to form a very solid mass which when baked results in carbonated bread. This is a vast improvement over the ordinary steps followed in baking bread. The carbon dioxide released by the yeast is not lost and it adds appreciably to the flavor and gustatory delight of the eater. In the absence of the important pressure and the rapid change in direction of the material such beneficial results will not be realized.

What I claim is:

1. A unitary kneading member for simultaneously moving material in opposite directions in a container in which the member is enclosed, said member including a central hub, a plurality of segments extending radially from said hub and inclined upwardly in respect to the direction of rotation of the hub, each segment having a concentric marginal wall along its outer extremity, and each wall section having a radially disposed extension inclined downwardly in respect to the direction of motion of the hub in order that the material in the container is drawn downward toward the bottom of the container by the segments adjacent the hub and is moved upward along the side walls of the container by the segments projecting outwardly from the integrally concentric dividing wall.

2. A kneading unit for simultaneously moving material in opposite directions in a container in which the unit is enclosed, said unit including a central hub, a shaft attached to the hub to rotate the unit, a plurality of inclined segments extending radially from said hub, a plurality of segments inclined in an opposite direction, concentric dividing walls between pairs of said radially disposed segments, said wall joining the segments and separating the material into two groups moving in opposite directions the ascending material being reversed in direction to descend onto the unit for continuous repetition during its rotation.

3. A unitary kneading element which comprises a central hub, a plurality of separate inner segments radiating from the hub, a plurality of separate outer segments radiating from the inner segments to constitute a radial group, concentric dividing walls between the inner and outer segments of each group, said inner and outer segments being oppositely inclined, a baffle tangentially positioned with respect to the hub between each succeeding radial group of segments for shifting material from a segment inclined in one direction to another segment inclined in an opposite direction to continuously move material in opposite directions within a container that encloses the kneading element, said baffles being supported beneath the segments.

4. A unitary kneading element which comprises concentrically arranged and integrally connected oppositely inclined segments integrally joined by a dividing wall, a baffle below the dividing wall and supported by the segments adapted to shift material from one side of said wall to the other to continuously change its direction of movement.

ERIC A. F. PRESSER.